(12) United States Patent
Baron et al.

(10) Patent No.: US 8,694,621 B2
(45) Date of Patent: Apr. 8, 2014

(54) CAPTURE, ANALYSIS, AND VISUALIZATION OF CONCURRENT SYSTEM AND NETWORK BEHAVIOR OF AN APPLICATION

(75) Inventors: Steven J. Baron, Nashua, NH (US); Patrick J. Malloy, Washington, DC (US); Alain J. Cohen, Washington, DC (US); Marc I. Schneider, Arlington, VA (US); Cheryl D. Stocks, Londonberry, NH (US)

(73) Assignee: Riverbed Technology, Inc., San Francisco, CA (US)

( * ) Notice: Subject to any disclaimer, the term of this patent is extended or adjusted under 35 U.S.C. 154(b) by 2042 days.

(21) Appl. No.: 11/505,176

(22) Filed: Aug. 16, 2006

(65) Prior Publication Data

US 2007/0043861 A1 Feb. 22, 2007

Related U.S. Application Data

(60) Provisional application No. 60/709,762, filed on Aug. 19, 2005.

(51) Int. Cl.
- *G06F 15/16* (2006.01)
- *G06F 15/177* (2006.01)
- *G06F 15/173* (2006.01)
- *G06F 9/46* (2006.01)
- *G06F 3/00* (2006.01)

(52) U.S. Cl.
USPC ........... 709/224; 709/202; 709/220; 709/223; 709/248; 709/250; 715/735; 718/107; 719/318

(58) Field of Classification Search
USPC ......... 709/223, 224, 225, 226, 231, 232, 248, 709/250
See application file for complete search history.

(56) References Cited

U.S. PATENT DOCUMENTS

| | | | |
|---|---|---|---|
| 5,375,199 A | 12/1994 | Harrow et al. | |
| 5,526,283 A * | 6/1996 | Hershey et al. | 709/224 |
| 5,867,659 A * | 2/1999 | Otteson | 709/224 |
| 6,061,724 A | 5/2000 | Ries et al. | |
| 6,745,351 B1 | 6/2004 | Mastro | |
| 6,801,940 B1 | 10/2004 | Moran et al. | |
| 6,968,540 B2 | 11/2005 | Beck et al. | |
| 6,975,330 B1 | 12/2005 | Charlton et al. | |
| 7,287,223 B2 | 10/2007 | Smolier et al. | |
| 7,293,287 B2 | 11/2007 | Fischman et al. | |
| 2002/0198985 A1 | 12/2002 | Fraenkel et al. | |
| 2003/0140282 A1 * | 7/2003 | Kaler et al. | 714/39 |
| 2005/0030979 A1 | 2/2005 | Malloy et al. | |
| 2005/0108379 A1 | 5/2005 | Gray et al. | |
| 2005/0262097 A1 * | 11/2005 | Sim-Tang et al. | 707/10 |
| 2006/0101447 A1 * | 5/2006 | Koch | 717/168 |

* cited by examiner

Primary Examiner — Ranodhi Serrao
Assistant Examiner — Farrukh Hussain
(74) Attorney, Agent, or Firm — Robert M. McDermott

(57) ABSTRACT

A first capture system that captures network communication events related to an application, and a second capture system that captures internal processing events related to the application. A visualization system analyzes the data captured by each of the capture systems, synchronizes and correlates the data, and presents an integrated display of these communication and processing events. In a preferred embodiment, the communicated messages include an identifier of the application, and the processing components also associate an identifier of the application to each recorded processing event. To facilitate the integrated display of the events, the visualization system synchronizes the recorded communication and processing events to a common time base.

59 Claims, 3 Drawing Sheets

```
Start Transaction Tracing

URL contains: _____
    Starting EJB name contains: _____
    Starting JSP name contains: _____

Transaction duration is:
    [X] violating dynamic limit by  20  %
    [ ] longer than _____ seconds Additional tracing options:
    [X] Record at most  100  transactions
    [X] Record no more than  5  transactions per second
    [X] Record for only  5  minutes ( Start )  ( Cancel )
```

CAPTURE, ANALYSIS, AND VISUALIZATION OF CONCURRENT SYSTEM AND NETWORK BEHAVIOR OF AN APPLICATION

This application claims the benefit of U.S. Provisional Patent Application 60/709,762 filed 19 Aug. 2005.

BACKGROUND AND SUMMARY OF THE INVENTION

This invention relates to the field of computer applications, and in particular to distributed applications that include communications among processors on a network.

With advances in networking technology, distributed applications continue to grow in popularity, and in complexity. In a typical distributed application, a client device may initiate the application, and the application may execute a request for data services at a remote server, and this remote server may in turn request data or other processing from other remote servers. The executed processes at the servers may be specific components of the application residing at the servers, or they may be components provided by the servers and accessed by the application.

Users of an application are generally sensitive to performance and reliability issues associated with the application, and in a competitive market, will generally avoid slow or unreliable applications. Application developers are also sensitive to these issues, to assure that their developed product remains competitive. In like manner, service providers are also sensitive to these issues, to assure that their provided service is not the cause of performance and reliability problems that may affect their customers.

Tools are available for assessing network traffic performance, as are tools to assess processing performance. However, from a network performance viewpoint, details are provided regarding such factors as latency delay, transmission delay, queuing delay, and so on, but the expenditure of time at a processing element is merely viewed as 'processing time', or 'non-network time'. In like manner, from a processing viewpoint, details are provided regarding the time spent performing each of a variety of functions, but the time consumed waiting for responses to requests and the like are merely viewed as 'communication time'.

A typical scenario for an application developer is to test/evaluate the application's overall performance by detecting when particular events occur, and from that information, determine the consumed time between events. Based on the consumed time between events, the developer attempts to optimize the performance of the application. However, because the processing of the application is distributed, the application developer must attempt to collect the data at each processor, as well as across the various communication links among the processors. This task, if feasible, is complicated by the fact that the application is generally run in an operational environment, and distinguishing events from one application from among events of other applications is often difficult.

Typically, the most comprehensive tool available to an application developer for network performance monitoring is a network trace system, such as the ACE system from OPNET Technologies, Inc., of Bethesda, Md., that captures data transmissions associated with an application across a network, and presents the information as a data exchange diagram, or as a Gantt chart, that illustrates the time spent communicating the application messages between nodes on the network, as well as the time spent at each node. These visualizations of the data communications illustrate the time spent at each node, but do not provide any insight as to the activities that consume the time at each node. To analyze performance at the nodes of a network, a system analysis tool, such as Panorama from OPNET Technologies, can be used to determine which processes are consuming the most time, and/or to identify anomalies in performance as an application is executed at the node. This conventional segregation of analysis tasks, between network analysis and system analysis, is poorly suited for analyzing the performance of distributed applications that increasingly rely upon a proper balance of network and system capabilities and interactions.

It is an objective of this invention to provide a method and system for capturing application-related events across a network, as well as within nodes/processors of the network. It is a further object of this invention to provide a method and system for analyzing captured network and processor/system events and to produce an integrated view of the delays incurred as application-related messages are communicated and processed among the distributed nodes/processors of a network.

These objectives, and others, are achieved by a method and system that include a first capture system that captures communication events related to an application, and a second capture system that captures processing events related to the application. A visualization system analyzes the data captured by each of the capture systems, synchronizes and correlates the data, and presents an integrated display of these communication and processing events. In a preferred embodiment, the communicated messages include an identifier of the application, and the processing components also associate an identifier of the application to each recorded processing event. To facilitate an integrated display of the events, the visualization system synchronizes the recorded communication and processing events to a common time base.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1A:
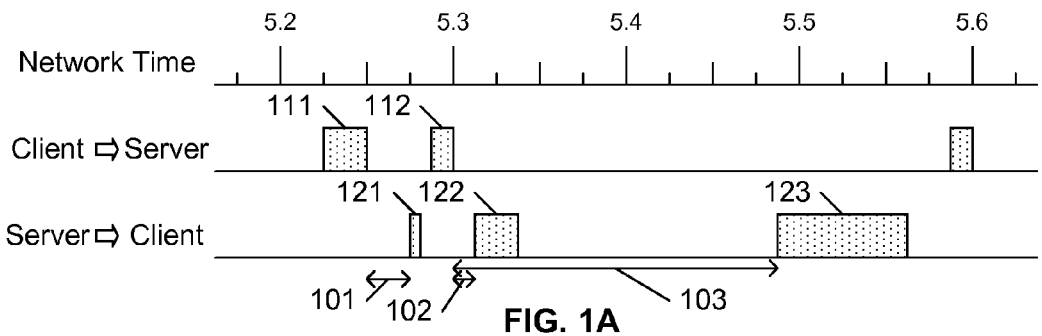
FIG. 1A illustrates an example timing diagram of communication events in a network.

FIG. 1A illustrates an example timing diagram corresponding to messages communicated on a network between a client and a server during execution of an application, as may be produced by a conventional network analysis system based on reports from monitoring devices distributed about the network. There may be other messages, from other applications, communicated between the client and server during the illustrated time period, and the network analysis system is configured to extract/filter the information provided by the monitoring devices to identify only those messages related to a given application. Typically, information in the header of each message can be used to uniquely identify the associated application.

In FIG. 1A, the client sends a message 111 to the server, and the server responds with a message 121 to the client. Presumably, the server performs some process based on the message 111 during the time period 101 between receipt of the message 111 and sending the response 121. In like manner, the client sends message 112 and the server responds with messages 122 and 123, with time periods 102 and 103 presumably corresponding to some processing at the server in response to the message 112.

Generally, a server is configured to service multiple clients, or other servers, and, based on the information displayed in FIG. 1A, the portion of the time periods 101, 102, and 103 consumed by processes related to the given application is indeterminable. Thus, a user of the network analysis system that provides the information in FIG. 1A is unable to determine the cause of these delays 101, 102, 103 without accessing one or more other monitoring systems.

Figure 1B:
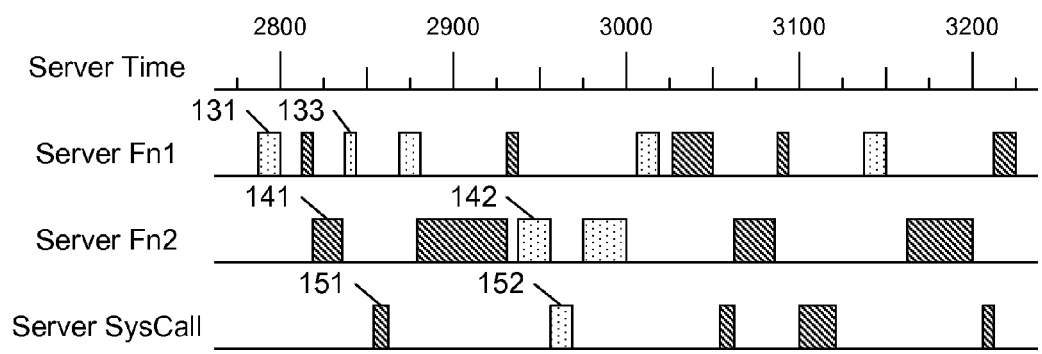
FIG. 1B illustrates an example timing diagram of executed processes on a node in a network.

FIG. 1B illustrates an example timing diagram corresponding to processing at the server, as may be produced by a conventional system monitoring system. In this example, three server functions are illustrated as being monitored, Fn1, Fn2, and SysCall, corresponding, for example, to two application functions, or two classes of application functions, identified as Fn1 and Fn2 running on the server, and a system-provided function, or set of functions, identified as SysCall. In this example, multiple application functions are being processed at the server, as indicated by the different shadings of the processing intervals 131, 132, etc. The particular system monitoring system will determine the level of detail to which the tracing will be applied. Some monitoring systems measure operating system processes, such as HP OpenView Internet Services, or measure JVMs based on external measurements, such as through JMX. Other monitoring systems, such as the aforementioned Panorama monitoring system allows tracing to much lower levels, including, for example, classes, methods, J2EE objects, and so on.

Figure 1C:
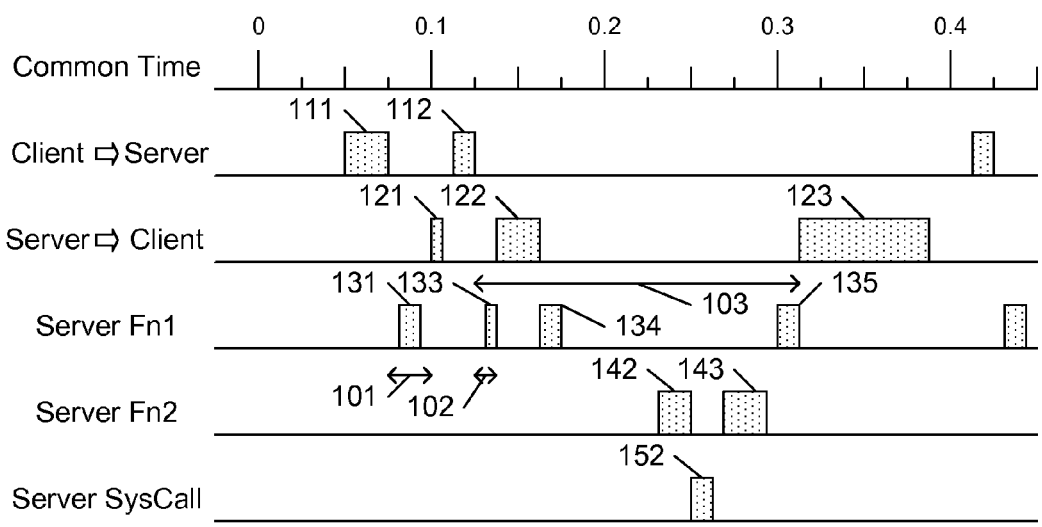
FIG. 1C illustrates an example integrated timing diagram of application-related events in a network.

In accordance with one aspect of this invention, network performance data and system performance data are captured and analyzed so as to facilitate an integrated visualization of the performance of an application as a combination of message propagation and information processing. FIG. 1C illustrates an example integrated view of the information of FIGS. 1A and 1B for the example application. In this example, the system analysis data of FIG. 1B is filtered to extract only the processing related to the given application (illustrated as the lighter shaded regions), and a common time base is established to provide a proper sequencing of the illustrated networking and system events, as discussed further below.

As in FIG. 1A, FIG. 1C illustrates the client sending a message 111 to the server, and the server responds with a message 121. As can be seen in FIG. 1C, the server performs function Fn1 at time interval 131 within the time span 101 between receiving message 111 and sending message 121. In like manner, the server performs function Fn1 at time interval 133 within time interval 102, and functions Fn1, Fn2, and SysCall at intervals 134, 142, 152, 143, and 135 within time interval 103. By presenting this integrated view, the system of this invention allows a user to follow the sequence of communications and processing as the distributed application performs its task. In FIG. 1C, for example, the user can see that only about half of the time 103 between messages 122 and 123 is consumed by processing at the server; the other half being consumed by other applications at the server.

Although FIG. 1C illustrates communication between only two nodes/tiers of the network, and the processing at only one node/tier, one of ordinary skill in the art will recognize that this integrated view could include multiple communication links and/or the processing at multiple nodes. For example, the server may be configured to access a database, and the display could include communications between tiers (client-server, server-database) as well as the processing at each tier (client, server, database). In a preferred embodiment, the timing diagrams are presented in an interactive environment, allowing the user to, for example, "drill down" to view lower levels of detail, adjust the time-scale, and so on.

Figures 2, 3:
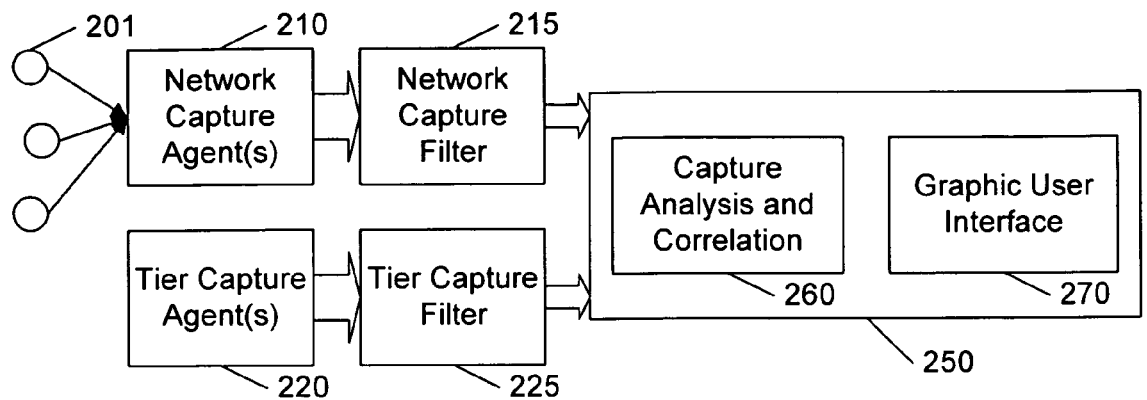
FIG. 2 illustrates an example capture, analysis, and visualization system in accordance with this invention.
FIG. 3 illustrates an example form input for setting capture configuration limits in accordance with this invention.

FIG. 2 illustrates an example block diagram of an application analysis system in accordance with this invention. The system includes a network capture agent 210 and filter 215, a tier capture agent 220 and filter 225, a visualization system 250 that includes a capture analysis and correlation module 260, and a graphical user interface module 270. The term "tier" is used herein to identify a 'processing' node, at which application messages are processed, as contrast to non-processing nodes of a network, such as switches and routers, which are virtually transparent to the application. The network capture agent 210 captures network traffic as it is seen on the network, optionally from remote sensors 201 on each key link in the network. This agent 210 may exist on a tier in the network, or it may be a separate system placed in the network for the sole purpose of capturing network traffic; multiple network agents 210 may co-exist on the network, each collecting data from different regions of a network. The network capture filter 215 filters the captured traffic to extract the timing information relevant to messages that are associated with the application being analyzed, generally based on information contained in the header of each message. Capture systems are commonly available, and include software based systems, such as OPNET's ACE capture agent, which is generally placed at key nodes of the network, or hardware based systems, such as NetScout's nGenius probe, which is generally placed at key links in a network.

The tier capture agent 220 collects information about the processing that is occurring on a node at any given moment. Generally, a tier capture agent 220 is placed on each node of interest in the network. The amount of information captured is dependent upon the capabilities of the particular agent and/or the level of analysis detail required. In a simple embodiment, the capture agent 220 provides a time stamped log file that indicates when significant events occur. In a more complex embodiment, the capture agent 220 instruments the application code at the node to record the entry and exit times for each function, or select functions, in the application.

The tier capture agent 220 may instrument a variety of types of applications. For example, the tier capture agent 220 may instrument a C-language application by modifying the entry point of a function contained in a library, so that trace information is collected each time the function is invoked. In like manner, a Java application running on the tier can be instrumented by the tier capture agent 220 by using the Java virtual machine profiling interface (JVM PI) or the Java virtual machine tool interface (JVM TI). Similarly, the tier capture agent 220 may instrument a .NET application running in the Microsoft .NET Common Language Runtime (CLR) through use of the .NET Profiling API. U.S. Pat. No. 6,968, 540, "SOFTWARE INSTRUMENTATION METHOD AND APPARATUS", issued 22 Nov. 2005 to Ralph L. Beck and Michael W. Romanchuk, teaches a variety of techniques for instrumenting object oriented software without requiring modification of any existing sequences of object resident instructions, and is incorporated by reference herein.

Preferably, the tier capture agent 220 includes the capability to capture both application information, such as the function call stack, as well as system statistics such as CPU utilization, disk activity, and so on. Generally, each thread of execution provides a stream of transactions corresponding to a stream of calls. In a preferred embodiment, the tier capture agent 220 captures transaction traces that include the hierarchy for each call to a function or class. The first transaction corresponds to the outermost call, and the last transaction corresponds to the completion of that call. By tracing the hierarchy, the time that an upper-level process waits for a lower-level process to complete can be distinguished from the time that the upper-level process is actively processing information. An example of a commercially available agent with this capability is the OPNET Panorama's Java Instrumentation Data Adapter, which uses techniques described in U.S. Pat. No. 6,968,540.

Depending upon the type of application being instrumented, the tier capture agent 220 may be configured to record additional information in the capture trace files, including, for example, J2EE applications such as servlets, JSPs and EJBs. Some of the information that can be recorded, for example, includes the URL used to invoke application, the user name associated with invocation, classes and methods, SQL strings associated with database activity, and so on.

Preferably, the tier capture agent 220 has minimal impact on the application being monitored. In a preferred embodiment, the user is provided the option of instrumenting each application on startup. If the user does not select instrumentation on startup, there would then be no impact on the application, and only 'externally' available information will be captured. If the user selects instrumentation, the loader modifies the object or byte code, or intermediate language, to allow dynamic instrumentation. This can be as simple an inserting a conditional check as to whether or not instrumentation logging should be enabled for this transaction. If true then the methods for this transaction are traced. If false, the only impact is overhead of the conditional check.

In a preferred embodiment, a variety of factors can be used to determine whether or not to trace a particular instance of a transaction. This could include, for example, whether or not any trace is currently enabled, the URL used to invoke the function, or the name of the function, object, class, servlet, EJB, NET package, and so on, invoked. Preferably, the user can select or modify the tests used to decide whether to capture the trace information, including, for example, specifying that any URL containing a particular string be traced.

Also in a preferred embodiment, the quantity and/or rate at which transactions are traced can be controlled. Some examples of criteria that may be used include, for example, the total number of transactions traced, the total number of transactions traced in a second, the duration of time to trace transactions, and so on. Additionally, sampling techniques can be used to capture a representative sample of the totality of transactions, including, for example, randomly selecting the transactions to trace.

To avoid recording many more transactions recorded than the user would be able to review, a preferred embodiment of the tier capture agent is configured to identify transaction of most interest to the user. For example, transaction traces can be stored in a temporary memory, and moved to permanent memory only if the trace meets certain criteria. Examples of these criteria include only keeping transactions if the total duration of the transaction exceeds a given threshold, or only keeping transactions where the total duration of the transaction exceeds a dynamically determined limit, such as the average total duration of the past N transactions. For example a transaction trace might only be kept if the total duration of the transaction exceeds the average total duration by more than 20 percent. Other types of criteria would be evident to one of ordinary skill in the art, such as RMON events and SNMP traps occurring during the transaction. Preferably, the user is able to retroactively trace transactions, using, for example a rolling buffer that contains the last N minutes of transactions, or the last M transactions. When the user enables transaction tracing, the proper entries in the rolling buffer are located and saved to permanent memory.

Also preferably, the tier capture agent 220 includes a control mechanism that allows the user to dynamically configure and initiate transaction tracing, including, for example, the use of a configuration file, a configuration dialog box, or a configuration webpage. FIG. 3 illustrates an example of a configuration control.

The tier capture agent 220 is preferably able to trace a transaction across different processes or threads on a tier. For example, a servlet might pass a transaction to a database process and the database process subsequently sends it results back to the servlet when complete. Several techniques can be used to trace the transaction across the processes, including, for example instrumenting each of the limited number of forms of interprocess communication. When a message is sent by interprocess communication, the instrumenting code tags the message with an identifier that is globally unique. The sent event and the identifier is then recorded in the trace. Upon receipt of the message, the instrumentation code records the receipt of the message in the trace for the receiving process.

The tier capture agent 220 may also instrument mobile code, such a Java applet. The applet is instrumented when it is sent to the system upon which it will run. The instrumented applet is assigned a globally unique identifier with which it tags its trace data. This trace data is then sent back to tier capture agent 220 for inclusion with the trace data from the other parts of the transaction.

The tier capture filter 225 allows the user to reduce the amount of data to be post-processed and displayed in the timing diagram/chart. The filter 225 preferably provides a number of different ways to filter the captured data for use by the capture analysis and correlation module 260.

One of the functions of the tier capture filter includes an optional mapping of individual function calls to a function group, such as an I/O function group, a database access function group, and so on. For a tier capture agent that produces function call stacks, there are several different mappings that may occur, and several passes of the filter may be applied. For example, a first pass may map the function names to groups such as database access functions, sorting functions, system calls, miscellaneous functions, and so on. In a second pass, the total time in each group is determined, and if that time does not exceed a user specified threshold, then all members of that group would be remapped to the miscellaneous functions group, or to a parent group if the groups are arranged hierarchically. For example, a database group may be divided into queries, updates, record creation, and so on. This sub-grouping may also be used by object oriented systems to organize function call stacks by class and method, or to indicate cross cutting functions in an aspect oriented system.

The tier capture filter 225 also preferably processes log files. Log files generally contain information about when events occur on the node in a form that is different from the function call stacks. For example, a server log may indicate the time that given functions finished processing, and from this information, the tier capture filter 225 may determine the time required to respond to a given request. This information is transformed into a common format for processing by the capture analysis and correlation module 260.

A number of different criteria may be used to include or exclude transactions in the tier capture filter 225. For example, the tier capture filter 225 may filter on a string associated with the transaction, such as transaction name, transaction URL, client name, database SQL strings in transaction, and so on. Transactions can be included or excluded based upon start or end time of the transaction, duration of the transaction, number of messages involved in the transaction, number of function invocations in the transaction, or statistical functions derived from these values, such as the number of messages involved in this transaction that exceed the average number of messages in transactions of this class by more than a given percentage. Preferably, any numerical parameter associated with the transaction can be compared to a threshold value to control the filtering of the transaction. One of ordinary skill in the art will recognize that filters may be combined to perform more complex filtering operations. One of ordinary skill in the art will also realize that additional filtering may be selectively invoked within the visualization system 250, to facilitate interactive diagnosis. For example, the user may select a transaction and choose to only display messages related to this transaction, or to only display transactions associated with application messages that exceed a given threshold, such as length or delay time, and so on.

The capture analysis and correlation module 260 combines the data from the network capture filter 215 and the tier capture filter 225, correlates the data in time, and analyzes this combined correlated data. The functions of the capture analysis and correlation module 260 include time alignment of trace data, cross trace transaction identification, statistic collection, and summarization, as well as the aforementioned interactive filtering of data.

Time alignment of traffic adjusts the times in the trace data to correct for offsets in the clocks on the various computers and probes used to collect the traces. For example, the clocks on the client and on the server may not be perfectly synchronized, and may not even use the same time base as the network capture elements, particularly if discrete hardware components are used to capture the data. The network capture data on one tier may be synchronized with the tier capture data at that tier, but may be different from the times recorded in the trace data from the other tier. FIGS. 1A and 1B illustrate different time bases being used for capturing network events and processing event. These time bases are adjusted/synchronized to a common time base prior to analysis. This adjustment can be as simple as prompting the user to supply the offset between the clocks, or as complex as performing a best fit statistical analysis of the occurrence of the captured events from each site. US Patent Application 2005/0030979 "SYNCHRONIZING PACKET TRACES", filed 9 Aug. 2004 for Patrick J. Malloy and Antoine D. Dunn, teaches a technique for synchronizing trace data by iteratively propagating timing constraints, and is incorporated by reference herein.

After synchronizing the trace data to a common time base, the module 260 determines which transactions seen on the network correspond to transactions at the tier. This process is known as cross trace transaction identification. In a preferred embodiment, network events are correlated with known network-related functions at the tier. For example, an application waiting for data from the network will block on one of several system calls, such as select, read, and so on. Upon receipt of network data, the application thread will unblock and return from the system call. This will be recorded as function exit in the function call stack, and can be used to match network activity and tier activity. If available, additional information can be used to simplify this process. For example, if the network transactions are transported on top of TCP or UDP, the IP addresses and port numbers will be recorded in the network trace. These five pieces of information (two addresses, two port numbers and the protocol) form a 5-tuple which uniquely identifies the stream of communication. The tier capture agent can also record the 5-tuple on which a particular thread is blocked. These 5-tuples can then used to match network activity with processing activity. This technique can also be used to match asynchronous network activity with tier processing. In a preferred embodiment, the user may manually associate network transactions with transaction activity on a given tier, and override any automated cross trace transaction identification.

A similar technique can be used to trace the flow of control across different threads of execution or processes. As detailed above, the tier capture agent may track the transfer of messages via interprocess communication, and these messages are tagged with globally unique identifiers. The module 260 can match transactions in traces by matching send events with the receive events using the same identifier. This technique also allows for the case where the processes are on different systems and the network traffic between those systems may not have been traced. This would also allow for tracing in the presence of mobile code such as Java applets, where the system on which the code will run may not be determined a priori.

After correlating the captured network and tier data, the module 260 performs statistic collection and summarization to facilitate efficient display of the captured information, as detailed below. In a preferred embodiment, the timing information is organized hierarchically, to facilitate the display of information at varying levels of detail, and the module 260 is configured to construct the hierarchy and to propagate/combine lower level statistics to provide summary values for the higher levels.

The graphic user interface module 270 presents the captured, filtered, and correlated information, typically as a hierarchical timing diagram, or hierarchical Gantt-type chart, using techniques common in the art, such as those used in conventional network analysis systems, such as OPNET's ACE interface.

In a preferred embodiment, a conventional network analysis graphic user interface is modified to display both network events from the network trace files and tier events from the tier trace files graphically in the same chart, using the same timescale and timeline for both types of events.

Figure 4:
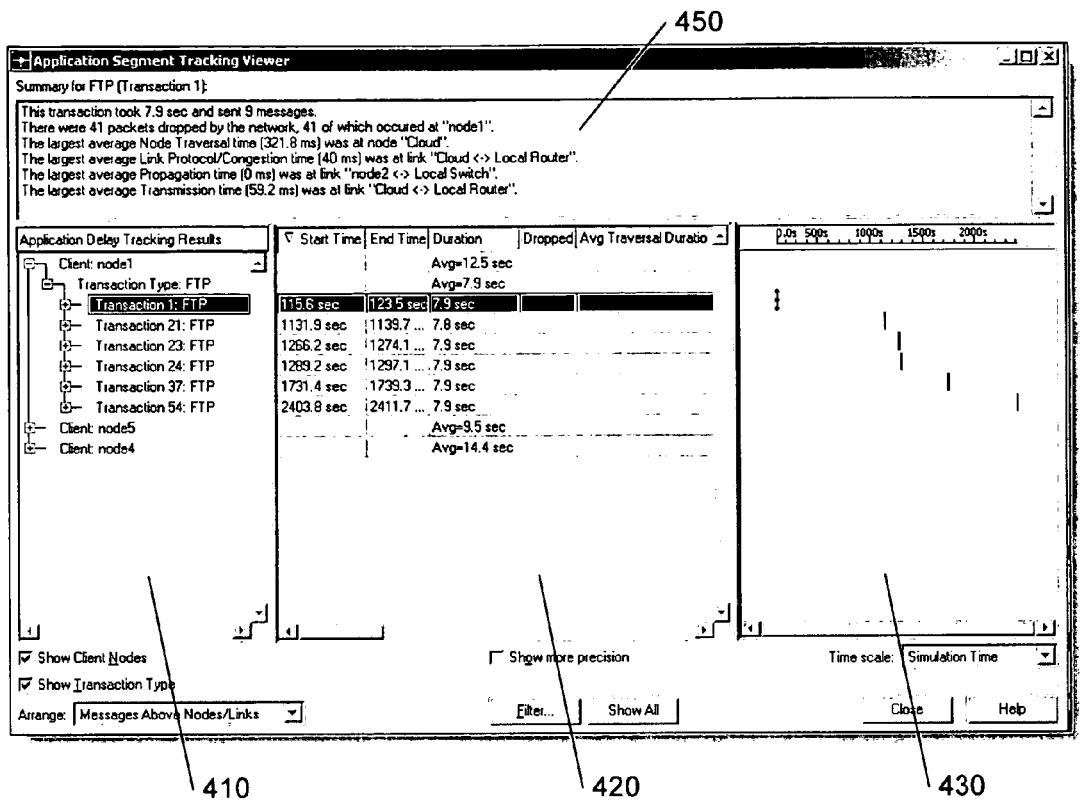
FIG. 4 illustrates an example interactive screen for presenting an integrated view of communication and processing events in accordance with this invention.

FIG. 4 illustrates an example graphical representation of the combined data, with multiple panels. The left panel 410 provides an identifier of the data being presented across the row, the center panel 420 provides summary statistics for the data, such as the start time, end time, and duration, and the right panel 430 provides a timing diagram that presents the information in a timing diagram or Gantt-type form, similar to FIG. 1C, discussed above. The upper panel 450 provides information related to items selected in the panels 410-430.

In a preferred embodiment, the displayed information can be presented in a variety of forms, or treeviews. In one treeview, the information is presented in a strict time sequence based on the start time of each event, so that an intermingling of network packet events and function, or function group, invocation events are displayed without regard to which transaction the events belong. In another treeview, the events are grouped by transactions. Each transaction is displayed as a single row, and the user is provided the option of expanding each transaction to display each of the individual events associated with that transaction. These events include both the application messages transmitted across the network, as well as each invocation of a function group, as identified by the tier filter 225 of FIG. 2, discussed above. In either form, each function group can be further expanded to display the individual function invocations.

As noted above, the center panel 420 displays the statistics and summary information, and in a preferred embodiment, the entire display can be resorted by any of the columns that appear in this center panel. Other arrangements of the rows of the display are discussed further below.

The rightmost panel 430 contains a graphical representation of the events in the trace files. This includes representation for both the network events, messages and transactions as well as the tier event and function invocations. Color in this section can be used to represent the nature of the tier function or event. For example, different colors can distinguish user functions from system calls. Another coloring scheme could use the system state to color the bars, with one color indicating a running process, and another indicating a blocked process, and so on. As noted above, a key feature of this invention is the display of both tier function processing and network transactions in a single graph, with a common timeline.

In a preferred embodiment, the timing diagram display is interactive, including for example, the option of changing the display to provide a more detailed view of the event or transaction. For example, double-clicking or otherwise selecting a time-interval bar of a network transaction may provide a data exchange chart for the relevant network transaction. Double-clicking on a tier processing bar may provide a profile screen that displays a break down of time spent in that function, and in functions invoked from that function, similar to the displays provided by an application profiler, such as IBM's Rational Rose product.

Preferably, the rows of the treeview can also be arranged by information associated with the transaction, including, for example, arranging transactions by URL, client host name, or username. That is, if the user chooses to organize the transactions by username, then all transactions for a given user will be grouped together in the treeview. This allows for easy identification of the sequence of transactions performed by a particular user.

The transactions may also be regrouped to show which transactions were active on which nodes. In this view there would be an entry in the treeview for each tier in the trace as well as for network activity. Entries for each tier will reflect the processing for a given transaction at that node, and each transaction can be expanded to include the entire function call stack for that node. The corresponding transaction will also appear under the network row, and messages transmitted across the network for that transaction will appear under that entry.

Panel 450 provides additional textual information about a selected transaction in the panels 410-430. This panel 450 provides a variety of information about the transaction and/or about the system state during the transaction. Examples of the transaction specific information include the slowest functions and messages involved with a transaction, the slowest nodes involved with the transaction, and so on. The system state information may include the number of transactions being processed on each node when this transaction was active, the average system load, the average system I/O utilization, the amount of free memory, the virtual memory usage statistics, and so on. Administrative information is also available for display, and includes, for example, information regarding which filters are enabled, the criteria or event that triggered the trace, and so on.

Figure 5:
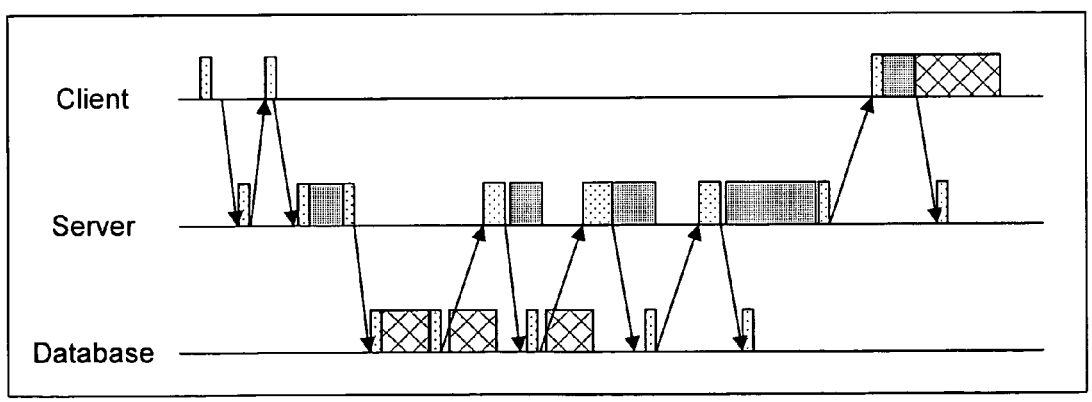
FIG. 5 illustrates an example interactive data exchange chart that includes processing events between communications in accordance with this invention.

FIG. 5 illustrates an alternative display of the timing information. In this display, the information is presented in a modified data exchange chart. In a conventional data exchange chart, each tier is represented as a horizontal line, and messages are represented as arrows between the tiers. In the modified data exchange chart of FIG. 5, processing at a tier is represented as a time-interval bar displayed along the tier line, and critical events are marked along this line at their time of occurrence. For example, if errors occur, they may be marked along the tier line in the data exchange chart.

As in FIG. 4, the display of FIG. 5 is preferably interactive, so that double clicking on the time-interval bars, or on the event markers, displays additional information about the associated events. For example, selecting a critical event marker results in a display of the text of the log message, and selecting a time interval bar will result in a display of a profiler breakdown of the functions invoked and the amount of time spent in each function.

One of ordinary skill in the art will recognize that other displays of the correlated timing information may be provided, including, for example, a combination of the treeview format of FIG. 4 for processing events and the data exchange format of FIG. 5 for network events.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the visualization system of this invention is presented herein as a stand-alone system, for ease of understanding, one of ordinary skill in the art will recognize that this invention may be embodied in existing network or system monitoring systems, or that this invention can be linked to existing network or system monitoring systems, such that these tools are invoked as required as the user proceeds through analyses and diagnostic activities. In like manner, ancillary information may be linked to displayed elements, such as 'tooltip' information that is displayed when a user points to or selects a displayed element. For example, selecting a transaction arrow in FIG. 5 could cause a display of source context information related to the particular transaction to facilitate analysis. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming) on a computer-readable medium, and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A system comprising:
a network capture system that is configured to capture communication events of an application on a network,
a tier capture system that is configured to capture processing events of the application on a node of the network, and
a visualization system that is configured to provide a synchronized display of the communication events and processing events of the application,
wherein each communication event includes information that facilitates identification of the application.

2. The system of claim 1, wherein
at least some of the communication events are recorded based on a first time base,
at least some of the processing events are recorded based on a second time base that differs from the first time base, and,
the visualization system is configured to determine a common time base and its relation to the first and second time bases.

3. The system of claim 1, wherein the processing events include application function calls within the application.

4. The system of claim 3, wherein the function calls include execution of classes, methods, or objects.

5. The system of claim 1, wherein the application includes instrumentation that is configured to provide a record of times associated with function calls within the application.

6. The system of claim 5, wherein the record of times associated with function calls includes a hierarchical record of the function calls.

7. The system of claim 5, wherein the instrumentation includes at least one of:
a Java Virtual Machine Profiling Interface (JVM PI),
a Java Virtual Machine Tool Interface (JVM TI), and
a .NET Profiling API.

8. The system of claim 5, wherein the instrumentation is configured to provide ancillary information that facilitates identification of the function calls, including at least one of: an invoking URL, a user name, classes, methods, and SQL strings.

9. The system of claim 5, wherein the instrumentation is configured to be selectively enabled.

10. The system of claim 9, wherein the instrumentation is selectively enabled based on at least one of an invoking URL and a function name.

11. The system of claim 9, wherein the selective enabling is configured to limit at least one of a quantity and rate of the record of times associated with function calls.

12. The system of claim 5, wherein the record of times includes:
a first record that is stored as a temporary record of each record of time within a time interval, and
a second record that is stored based on selection criteria applied to the first record.

13. The system of claim 12, wherein the selection criteria includes exception criteria that is configured to distinguish between routine events and recordable events.

14. The system of claim 5, wherein the instrumentation is configured to trace the processing events across different threads of the application.

15. The system of claim 1, wherein the tier capture system includes:
a tier capture agent that is configured to determine times associated with function calls within the application, and
a tier capture filter that is configured to filter the times associated the function calls based on user definable preferences.

16. The system of claim 15, wherein
the user definable preferences include a mapping of one or more function calls to one or more function groups, and
the tier capture filter is configured to provide composite time parameters corresponding to each function group.

17. The system of claim 16, wherein
the user definable preferences include a mapping of one or more function groups to one or more upper-level function groups in a hierarchical manner, and
the tier capture filter is configured to provide other composite time parameters corresponding to at least one of the upper-level function groups, based on the composite time parameters corresponding to the function groups within the upper-level function groups.

18. The system of claim 1, wherein the network capture system includes
a network capture agent that is configured to determine times associated with communications to and from the node, and
a network capture filter that is configured to filter the times associated with the communications to identify communications associated with the application.

19. The system of claim 1, wherein the visualization system includes an analysis module that is configured to correlate the communication events and the processing events.

20. The system of claim 19, wherein the analysis module correlates the communication and processing events based on Internet Protocol (IP) addresses and ports.

21. The system of claim 19, wherein the analysis module correlates the communication and processing events based on corresponding send and receive communication events.

22. The system of claim 19, wherein the analysis module is configured to determine statistics related to the processing events.

23. The system of claim 22, wherein the analysis module is configured to determine the statistics corresponding to a hierarchical organization of the processing events, to facilitate display of the statistics at multiple levels of detail.

24. The system of claim 19, wherein the visualization system includes a graphical user interface.

25. The system of claim 24, wherein the graphical user interface is configured to display a timing diagram that illustrates associations between the communication and processing events.

26. The system of claim 24, wherein the graphical user interface is configured to display statistics related to the processing events.

27. The system of claim 26, wherein the graphical user interface is configured to facilitate display of the statistics at multiple levels of detail.

28. The system of claim 24, wherein the graphical user interface is configured to facilitate selective display of information related to the communication and processing events.

29. The system of claim 28, wherein the selective display includes a user selectable arrangement for sorting the communication and processing events.

30. The system of claim 29, wherein the selective display includes a Gantt-type display of the processing events.

31. The system of claim 28, wherein the selective display includes display of information at select levels of detail.

32. The system of claim 24, wherein the graphical user interface is configured to provide information associated with the processing events using a plurality of coordinated panels that include:
   a first panel that identifies the events,
   a second panel that provides statistics related to the events, and
   a third panel that provides a graphic display of occurrences of the events over time.

33. A method for execution on a plurality of machines on a communication network, comprising:
   capturing communication events of an application on the network,
   capturing processing events of the application on a node of the network, and
   providing a synchronized display of the communication events and processing events of the application,
   wherein each communication event includes information that facilitates identification of the application.

34. The method of claim 33, wherein
   at least some of the communication events are recorded based on a first time base,
   at least some of the processing events are recorded based on a second time base that differs from the first time base, and
   the method includes determining a common time base and its relation to the first and second time bases.

35. The method of claim 33, wherein capturing the processing events includes providing a record of times associated with function calls within the application.

36. The method of claim 35, including selectively enabling capturing of the processing events.

37. The method of claim 36, wherein the selective enabling is based on at least one of an invoking URL and a function name.

38. The method of claim 36, wherein the selective enabling is configured to limit at least one of a quantity and rate of the record of times associated with function calls.

39. The method of claim 35, including tracing the processing events across different threads of the application.

40. The method of claim 33, wherein capturing the processing events includes:
   determining times associated with function calls within the application, and
   filtering the times associated the function calls based on user definable preferences.

41. The method of claim 40, wherein
   the user definable preferences include a mapping of one or more function calls to one or more function groups, and
   the filtering provides composite time parameters corresponding to each function group.

42. The method of claim 33, wherein
   capturing the communication events includes:
   determining times associated with communications to and from the node, and
   filtering the times associated with the communications to identify communications associated with the application.

43. The method of claim 33, including correlating the communication events and the processing events.

44. The method of claim 33, including correlating the communication events and the processing events based on at least one of:
   Internet Protocol (IP) addresses and ports, and
   corresponding send and receive communication events.

45. The method of claim 33, including determining statistics related to the processing events.

46. The method of claim 33, including determining statistics corresponding to a hierarchical organization of the processing events, to facilitate display of the statistics at multiple levels of detail.

47. The method of claim 33, including displaying a timing diagram that illustrates associations between the communication and processing events.

48. The method of claim 47, including displaying statistics related to the processing events.

49. The method of claim 48, including providing a graphical user interface to facilitate display of the statistics at multiple levels of detail.

50. The method of claim 49, including selectively displaying information related to the communication and processing events.

51. The method of claim 50, wherein selectively displaying includes sorting the communication and processing events based on a user's preference.

52. The method of claim 48, including displaying the processing events in a Gantt-type format.

53. The method of claim 48, including displaying information related to the processing events at select levels of detail.

54. The method of claim 48. including providing information associated with the processing events using a plurality of coordinated panels that include:
   a first panel that identifies the events,
   a second panel that provides statistics related to the events, and
   a third panel that provides a graphic display of occurrences of the events over time.

55. A non-transitory computer-readable medium that includes a computer program that, when executed by a processor, is configured to cause the processor to:
   capture communication events of an application on a network,
   capture processing events of the application on a node of the network, and
   provide a synchronized display of the communication events and processing events of the application,
   wherein each communication event includes information that facilitates identification of the application.

56. The medium of claim 55, wherein capturing the processing events includes determining times associated with function calls within the application.

57. The medium of claim 56, wherein the computer program is configured to cause the processor to determine statistics corresponding to a hierarchical organization of the processing events, to facilitate display of the statistics at multiple levels of detail.

58. The medium of claim 56, wherein the computer program is configured to cause the processor to display a timing diagram that illustrates associations between the communication and processing events.

59. The medium of claim 56, wherein the computer program is configured to cause the processor to selectively display information related to the communication and processing event.

* * * * *